(No Model.)
A. W. NEWELL.
OIL WELL PACKER.
No. 451,769. Patented May 5, 1891.
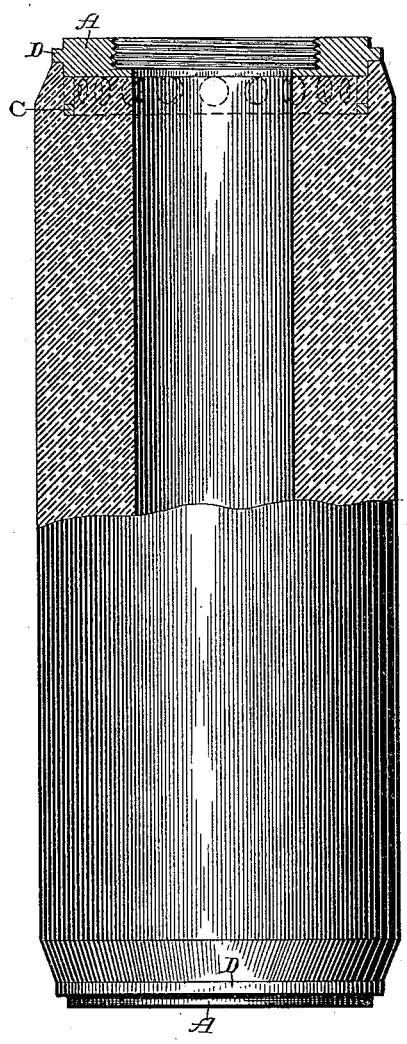
Fig. 1.
Fig. 2.
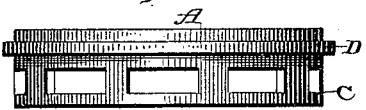
Witnesses:
Inventor:
A. W. Newell,
per Lehmann & Pattison,
Attys.

UNITED STATES PATENT OFFICE.

AUGUSTUS W. NEWELL, OF BRADFORD, PENNSYLVANIA.

OIL-WELL PACKER.

SPECIFICATION forming part of Letters Patent No. 451,769, dated May 5, 1891.

Application filed February 27, 1891. Serial No. 383,108. (No model.)

*To all whom it may concern:*

Be it known that I, AUGUSTUS W. NEWELL, of Bradford, in the county of McKean and State of Pennsylvania, have invented certain new and useful Improvements in Oil-Well Packers; and I do hereby declare the following to be a full, clear, and exact description of the invention, such as will enable others skilled in the art to which it pertains to make and use it, reference being had to the accompanying drawings, which form part of this specification.

My invention relates to an improvement in oil-well packers; and it consists in a metallic cap-piece provided with a vertical flange of any suitable width around one edge, and which flange is provided with a series of perforations, so that when the rubber is molded in a plastic condition it will enter the perforations, and thus secure the cap-pieces in position upon the ends of the packing, as will be more fully described hereinafter.

The object of my invention is to provide a packing for oil-wells which will prevent the passage of oil, gas, and water, and which is cheap and simple in construction and easily applied.

In the accompanying drawings, Figure 1 represents a vertical section of a packing which embodies my invention. Fig. 2 is a side elevation.

A represents a metallic cap-piece, which is applied to one end of the rubber packing, and which is provided with a screw-threaded socket in its outer end to make connection with the packing-frame, and with a vertical flange C, which extends from its inner edge, and which flange is provided with perforations through and around which the rubber while being molded passes. Formed around upon the outer side of the packing is the horizontal flange D, which serves as a protection for the end or edge of that portion of the rubber which comes outside of the vertical flange C, and thus prevents the rubber from being injured at this point while being lowered into or removed from the well.

The cap-pieces here shown have no corrugations, grooves, or depressions, but are simple plain caps or rings with perforations of any desired shape through the vertical flanges, through which the rubber packs so as to secure the caps to the rubber in such a manner that the caps can only be removed by destroying the packing. By compressing the rubber upon the caps while in a soft condition the rubber packs through the perforations from both sides, and hence adheres to the caps with great firmness. The infolding of the rubber covering the outsides of the flanges and meeting through the perforations from the outsides of the flanges serves to bind the caps to the rubber much more positively than can be done by means of corrugations or annular depressions in the caps, such as have been used heretofore. The construction here shown also enables the caps to be produced more easily and cheaply than any that have heretofore been placed upon the market, and that the packing can be reduced in thickness and the opening in the cap enlarged for the purpose of receiving larger tubes without weakening the point of connection between the cap and the packing, as the holding-flange C is wholly embedded in the rubber and held by the webs of the packing which pass through the transverse perforations.

Having thus described my invention, I claim—

An oil-well packer comprising a packing, combined with a cap consisting of a ring having a base that rests upon the end of the packing and a vertical flange of less diameter than the packing and having transverse perforations, whereby the flange is wholly inclosed within the packing, substantially as described.

In testimony whereof I affix my signature in presence of two witnesses.

AUG. W. NEWELL.

Witnesses:
LEWIS NEWELL,
HENRY F. NEWELL.